(12) United States Patent
Lawson et al.

(10) Patent No.: US 7,524,161 B2
(45) Date of Patent: Apr. 28, 2009

(54) GAS TURBINE ENGINE BLADE CONTAINMENT ASSEMBLY

(75) Inventors: Michael R. Lawson, Derby (GB); Sivasubramaniam K. Sathianathan, Burton on Trent (GB)

(73) Assignee: Rolls-Royce PLC, London (GB)

( * ) Notice: Subject to any disclaimer, the term of this patent is extended or adjusted under 35 U.S.C. 154(b) by 206 days.

(21) Appl. No.: 11/647,257

(22) Filed: Dec. 29, 2006

(65) Prior Publication Data

US 2007/0110557 A1    May 17, 2007

Related U.S. Application Data

(62) Division of application No. 11/046,246, filed on Jan. 31, 2005, now Pat. No. 7,192,243.

(30) Foreign Application Priority Data

Feb. 21, 2004    (GB) ................. 0403941.8

(51) Int. Cl.
*F01D 25/24*    (2006.01)
(52) U.S. Cl. ................. 415/9; 415/213.1; 415/220
(58) Field of Classification Search ............ 415/9, 415/200, 213.1, 220
See application file for complete search history.

(56) References Cited

U.S. PATENT DOCUMENTS 4,063,847 A * 12/1977 Simmons ............ 415/200
4,648,795 A    3/1987 Lardellier
6,053,696 A *  4/2000 Roberts ............ 415/9
6,179,551 B1   1/2001 Sathianathan et al.
6,290,455 B1   9/2001 Hemmelgarn et al.
6,619,913 B2 * 9/2003 Czachor et al. ........ 415/119

FOREIGN PATENT DOCUMENTS

EP    A 0 965 731    12/2000
EP    A 1 245 791    10/2002
EP    A 1 104 837    1/2003

* cited by examiner

*Primary Examiner*—Ninh H Nguyen
(74) *Attorney, Agent, or Firm*—Oliff & Berridge, PLC

(57) ABSTRACT

A gas turbine engine rotor blade containment assembly (38) comprises a generally cylindrical, or frustoconical, metal casing (40). The metal casing (40) has at least one arched portion (62,64,66) and each arched portion (62,64,66) extends circumferentially around the metal casing (40). Each arched portion (62,64,66) comprises a radially inwardly extending arch (68) in which the trough (74) of the arch (68) is radially inwardly of a straight line (76) interconnecting the axial ends (70,72) of the arch (68). The trough (74) of the arch (68) is radially inwardly of the at least one of the axial ends (70,72) of the at least one arch (68). The arched portions (62,64,66) introduce compressive stresses into the metal casing (40) during a fan blade 34 impact and enable the metal casing (40) to withstand the impact. The fan blade containment assembly (38) is lighter for large diameter turbofan gas turbine engine (10).

16 Claims, 4 Drawing Sheets

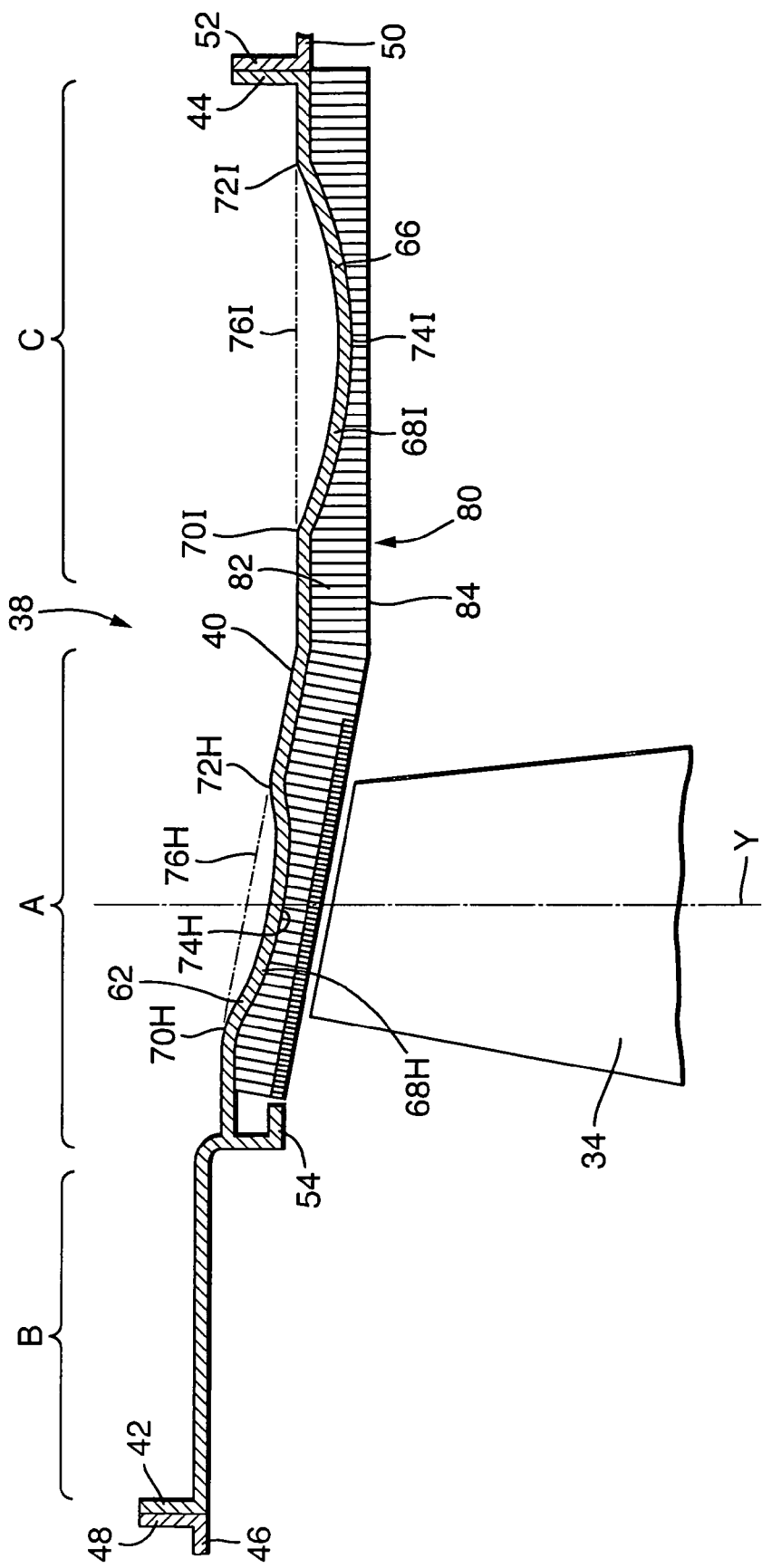

GAS TURBINE ENGINE BLADE CONTAINMENT ASSEMBLY

This is a Division of application Ser. No. 11/046,246 filed Jan. 31, 2005. The disclosure of the prior application is hereby incorporated by reference herein in its entirety.

The present invention relates to gas turbine engine casings, particularly gas turbine engine fan casings and turbine casings, more particularly to an improved blade containment assembly for use within or forming a part of the gas turbine engine casing.

Turbofan gas turbine engines for powering aircraft conventionally comprise a core engine, which drives a fan. The fan comprises a number of radially extending fan blades mounted on a fan rotor enclosed by a generally cylindrical fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above-mentioned containment casings. In the event that a blade becomes detached it passes through the casing and is contained by the fibrous material.

Our published European patent application EP0965731A2 discloses a metallic casing provided with a number of circumferentially and radially extending ribs to strengthen the metal casing.

However, the relatively thick containment casings are relatively heavy, the relatively thin casings enclosed by the fibrous material are lighter but are more expensive to manufacture. The relatively thick casings with fibrous material are both heavier and more expensive to manufacture.

Accordingly the present invention seeks to provide a novel gas turbine engine casing, which overcomes the above-mentioned problems.

Accordingly the present invention provides a gas turbine engine rotor blade containment assembly comprising a generally cylindrical, or frustoconical, casing, the casing having at least one arched portion, the at least one arched portion extending circumferentially around the casing, the at least one arched portion comprising a radially inwardly extending arch in which the trough of the arch is radially inwardly of an imaginary, cylinder or imaginary frustocone, interconnecting the axial ends of the arch, the at least one arched portion surrounding the rotor blades of the gas turbine engine, a first axial end of the at least one arched portion being arranged substantially in a plane containing the leading edges of the rotor blades and a second axial end of the at least one arched portion being arranged substantially in a plane containing the trailing edges of the rotor blades.

Preferably the trough of the at least one arch is radially inwardly of at least one of the axial ends of the at least one arch.

Preferably the trough of the at least one arch is radially inwardly of both the axial ends of the at least one arch.

Preferably there is a plurality of arched portions, the arched portions being axially spaced along the casing in different gas turbine engine rotor blade containment regions.

Preferably one of the arched portions is in a plane containing the rotor blades of the gas turbine engine.

Preferably at least one of the arched portions is axially downstream of the plane containing the rotor blades of the gas turbine engine.

Preferably two arched portions are axially downstream of the plane containing the rotor blades of the gas turbine engine.

Preferably at least one of the arched portions is axially upstream of the plane containing the rotor blades of the gas turbine engine.

Preferably two arched portions surround the rotor blades of the gas turbine engine. Preferably the arched portions are immediately axially adjacent each other.

Preferably the casing comprises first attachment means at the upstream end of the casing and second attachment means at the downstream end of the casing.

Preferably the first and second attachment means comprise first and second circumferentially and radially extending flanges respectively.

Preferably the casing comprises a first circumferentially and radially extending rib arranged at a first axial end of the at least one arched portion.

Preferably the casing comprises a second circumferentially and radially extending rib arranged at a second axial end of the at least one arched portion.

Preferably the casing comprises a third circumferentially and radially extending rib arranged at the trough of the at least one arched portion.

Alternatively the casing comprises a first circumferentially and radially extending rib arranged at the trough of the at least one arched portion.

Preferably the casing comprises a circumferentially, radially inwardly and axially downstream extending member arranged upstream of the plane containing the rotor blades of the gas turbine engine.

Preferably the circumferentially, radially inwardly and axially downstream extending member is arranged at an axial end of an arch of at least one of the arched portions.

Preferably the arch has an arcuate shape in cross-section or comprises a plurality of straight lines in cross-section.

Preferably the arcuate shape comprises a section of a circle, a section of an ellipse, a catenary shape.

Preferably the plurality of straight lines comprises a section of a polygon.

Preferably the rotor blade containment assembly is a fan blade containment assembly.

Preferably the casing is a metal casing.

Preferably the metal casing comprises titanium, titanium alloy, aluminium, aluminium alloy, nickel, nickel alloy or steel.

Preferably the at least one arched portion is superplastically formed.

The present invention will be more fully described by way of example with reference to the accompanying drawings in which:

FIG. 4 is a further alternative enlarged longitudinal cross-sectional view of the fan blade containment assembly shown in FIG. 1.

Figure 1:
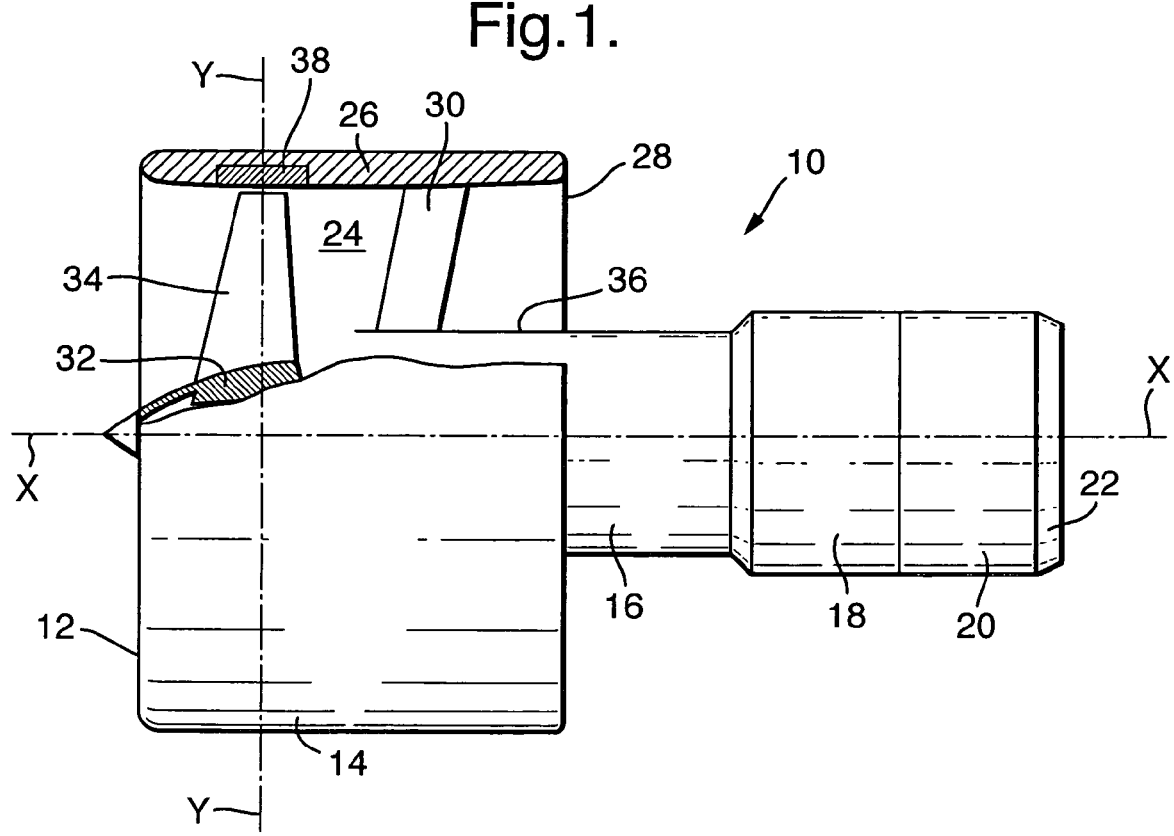
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane of the fan blades 34.

Figure 2:
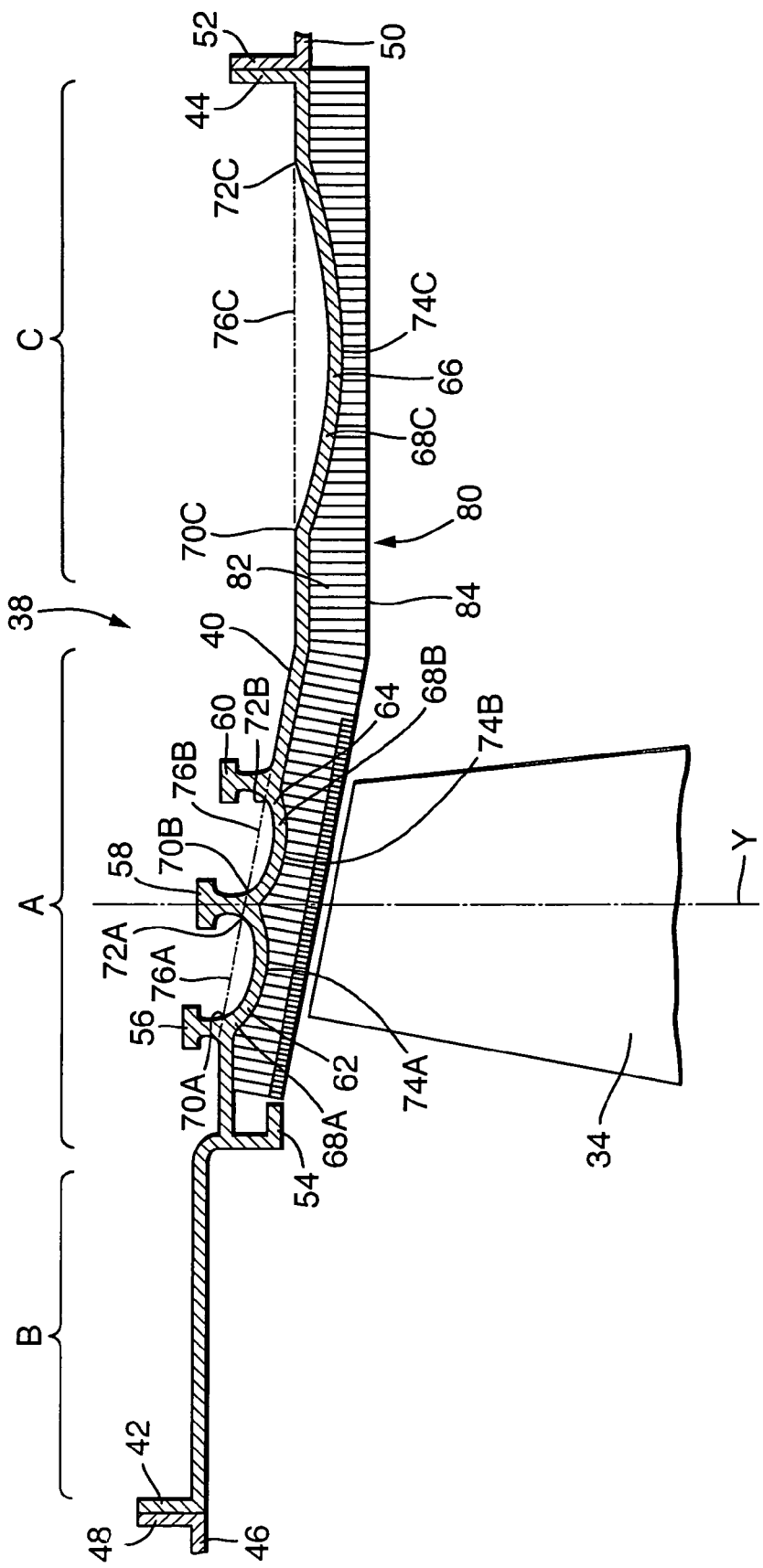
FIG. 2 is an enlarged longitudinal cross-sectional view of the fan blade containment assembly shown in FIG. 1.

The fan casing 26 and fan blade containment assembly 38 is shown more clearly in FIG. 2. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26.

The fan blade containment region A is substantially in the plane Y containing the fan blades 34. The fan blade containment region B is upstream of the plane Y of the fan blades 34 and downstream of the flange 42, where debris protection is required for the fan blade containment assembly 38. The fan blade containment region C is downstream of the plane Y of the fan blades 34, where a root of a fan blade 34 impacts the fan blade containment assembly 38.

The metal casing 40 provides the basic fan blade containment and provides a connection between the intake casing 46 and the rear casing 50. The metal casing 40 comprises a circumferentially, radially inwardly and axially downstream extending member, or hook, 54 arranged upstream of the plane Y containing the fan blades 34 and upstream of a plane containing the leading edge of the tips of the fan blades 34. The metal casing 40 also comprises a plurality of circumferentially and radially outwardly extending ribs 56, 58 and 60 respectively axially spaced apart along the metal casing 40. The rib 56 is arranged substantially in a plane containing the leading edge of the fan blades 34, the rib 58 is arranged substantially in the plane Y containing the fan blades 34 and the rib 60 is arranged substantially in a plane containing the trailing edges of the fan blades 34.

The metal casing 40 also comprises a plurality of arched portions 62, 64 and 66 respectively axially spaced apart along the metal casing 40. The arched portions 62 and 64 are arranged in the fan blade containment region A. In particular the arched portion 62 is arranged between the ribs 56 and 58 and the arched portion 64 is arranged between the ribs 58 and 60. The arched portion 66 is arranged in the fan blade containment region C. Each arched portion 62, 64 and 66 extends circumferentially around the metal casing 40 and each arched portion 62, 64 and 66 comprises an arch 68A, 68B and 68C respectively having pairs of axial ends 70A and 72A, 70B and 72B and 70C and 72C respectively and trough 74A, 74B and 74C respectively. Each arched portion 62, 64 and 66 is arranged such that the troughs 74A, 74B and 74C of the respective arches 68A, 68B and 68C is radially inwardly of an imaginary frustocone 76A and 76B and an imaginary cylinder 76C interconnecting the axial ends 70A and 72A, 70B and 72B and 70C and 72C respectively of the arches 68A, 68B and 68C respectively.

Preferably the troughs 74A, 74B and 74C of the arches 68A, 68B and 68C are arranged radially inwardly of at least one of the respective axial ends 70A, 70B, 70C or 72A, 72B and 72C of the arched portions 62, 64 and 66. Preferably the troughs 74A, 74B and 74C of the arched portions 62, 64 and 66 are arranged radially inwardly of both the respective axial ends 70A and 72A, 70B and 72B and 70C and 72C of the arches 68A, 68B and 68C.

In this arrangement the two arched portions 62 and 64 are arranged adjacent the plane containing the fan blades 34 of the gas turbine engine 10 and the arched portions 62 and 64 are immediately axially adjacent each other. The rib 58 is arranged substantially in the plane Y containing the fan blades 34 of the gas turbine engine 10 and the arched portions 62 and 64 are arranged immediately axially upstream and axially downstream respectively of the plane Y containing the fan blades 34 of the gas turbine engine 10.

It is seen that in the fan blade containment region A the metal casing 40 comprises a first rib 56 arranged at a first axial end 70A of the arched portion 62. The metal casing 40 comprises a second rib 58 arranged at a second axial end 72A of the arched portion 62. It is also seen that in the fan blade containment region A the metal casing 40 comprises a second rib 56 arranged at a first axial end 70B of the arched portion 64. The metal casing 40 comprises a third rib 60 arranged at a second axial end 72B of the arched portion 64.

Thus the axial end 70A of the arched portion 62 is substantially in a plane containing the leading edges of the fan blades 34 and the axial end 72B of the arched portion 64 is substantially in a plane containing the trailing edges of the fan blades 34. The axial end 72A of the arched portion 62 and the axial end 70B of the arched portion 64 are substantially in the plane Y containing the mid chord of the fan blades 34. The mid chord is a position at the middle of the fan blades 34 between the leading and trailing edges at the tip of the fan blades 34.

The arches 68A, 68B and 68C may have an arcuate shape in cross-section or may comprise a plurality of straight lines in cross-section. The arcuate shape may comprise a section of a circle, a section of an ellipse, a catenary shape e.g. a parabola. The plurality of straight lines may comprise a section of a polygon.

An acoustic lining 80 may be provided on the inner surface of the first metal casing 40. The acoustic lining 80 comprises a honeycomb 82 and a perforate sheet 84. The honeycomb 82 and perforate sheet 84 are quite conventional.

In operation of the gas turbine engine 10, in the event that a fan blade 34, or a portion of a fan blade 34, becomes detached it encounters the metal casing 40. The metal casing 40 is impacted by the fan blade 34, or portion of the fan blade 34, and the metal casing 40 effectively remove energy from the fan blade 34, or portion of the fan blade 34. During an impact of the fan blade 34, or portion of a fan blade 34, the arched portions 62, 64 and 66 of the metal casing 40 deform and put the metal casing 40 into compression, rather than tension.

The fan blade containment assembly of the present invention has several advantages. The present invention uses the extra capability of strength, ductility and stiffness of the metal casing when compressed to withstand the impact forces and thus this allows a lighter fan blade containment assembly, it is estimated there will be a 10% to 15% reduction in thickness of the metal casing compared to that in EP0965731A2.

Figure 3:
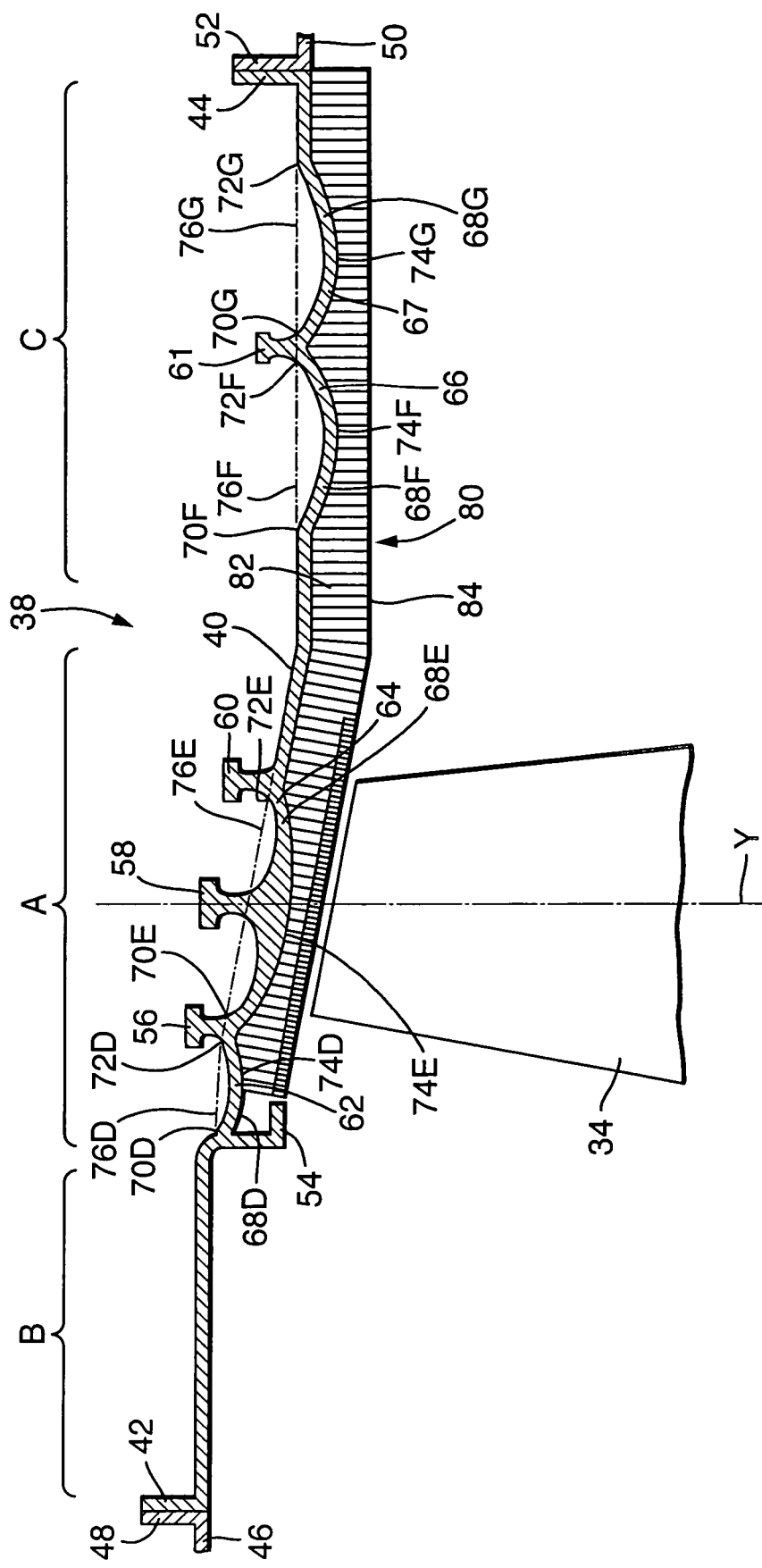
FIG. 3 is an alternative enlarged longitudinal cross-sectional view of the fan blade containment assembly shown in FIG. 1.

An alternative fan blade containment assembly 38B according to the present invention is shown in FIG. 3 and this is similar to that shown in FIG. 2 and like parts are denoted by like numerals.

The metal casing 40 also comprises a plurality of arched portions 62, 64, 66 and 67 respectively axially spaced apart along the metal casing 40. The arched portions 62 and 64 are arranged in the fan blade containment region A and in particular the arched portion 62 is arranged between the hook 54 and the rib 56, the arched portion 64 is arranged between the ribs 56 and 60. The arched portions 66 and 67 are arranged in the fan blade containment region C. Each arched portion 62, 64, 66 and 67 extends circumferentially around the metal casing 40 and each arched portion 62, 64, 66 and 67 comprises an arch 68D, 68E, 68F and 68G having pairs of axial ends 70D and 72D, 70E and 72E, 70F an 72F and 70G and 72G respectively and troughs 74D, 74E, 74F and 74G respectively. Each arched portion 62, 64, 66 and 67 is arranged such that the troughs 74D, 74E, 74F and 74G of the arches 68D, 68E, 68F and 68G respectively are radially inwardly of imaginary frustocones 76D and 76E and imaginary cylinders 76F and 76G respectively interconnecting the ends 70D and 72D, 70E and 72E, 70F and 72F and 70G and 72G respectively of the arches 68D, 68E, 68F and 68G respectively.

Preferably the troughs 74D, 74E, 74F and 74G of the arched portions 62, 64, 66 and 67 are arranged radially inwardly of at least one of the axial ends 70D, 70E, 70F and 70G or 72D, 72E, 72F and 72G of the arches 68D, 68E, 68F and 68G respectively. Preferably the troughs 74D, 74E, 74F and 74G of the arches 68D, 68E, 68F and 68G respectively are arranged radially inwardly of both the axial ends 70D and 72D, 70E and 72E, 70F and 72F and 70G and 72G respectively of the arches 68D, 68E, 68F and 68G respectively.

In this arrangement the arched portion 64 is arranged substantially in the plane Y containing the fan blades 34 of the gas turbine engine 10 and the arched portions 62 and 64 are immediately axially adjacent each other. The trough 74E of the arched portion 64 is arranged substantially in the plane Y containing the fan blades 34 of the gas turbine engine 10.

It is seen that in the fan blade containment region A the metal casing 40 comprises a hook 54 arranged at a first axial end 70D of the arched portion 62. The metal casing 40 comprises a first rib 56 arranged at a second axial end 72D of the arched portion 62. It is also seen that in the fan blade containment region A the metal casing 40 comprises the first rib 56 arranged at a first axial end 70E of the arched portion 64. The metal casing 40 comprises a second rib 58 arranged at the trough 74E of the arched portion 64. The metal casing 40 comprises a third rib 60 arranged at a second axial end 72E of the arched portion 64.

Thus the axial end 70D of the arched portion 62 is substantially in a plane containing the hook 54 and the axial end 78D is substantially in a plane containing the leading edges of the fan blades 34. The axial end 70E of the arched portion 64 is substantially in a plane containing the leading edges of the fan blades 34 and the axial end 72E of the arched portion 64 is substantially in a plane containing the trailing edges of the fan blade 34. The trough 74E of the arched portion 64 is arranged substantially in the plane Y containing the mid chord of the fan blades 34.

It is seen that in the fan blade containment region C the metal casing 40 comprises a circumferentially and radially outwardly extending rib 61 arranged at a second axial end 72F of the arched portion 66 and at a first axial end 70G of the arched portion 67.

An alternative fan blade containment assembly 38C according to the present invention is shown in FIG. 4 and this is similar to that shown in FIG. 2 and like parts are denoted by like numerals.

The metal casing 40 also comprises a plurality of arched portions 62 and 66 respectively axially spaced apart along the metal casing 40. The arched portion 62 is arranged in the fan blade containment region A and in this example the metal casing 40 is not provided with ribs. The arched portion 66 is arranged in the fan blade containment region C. Each arched portion 62 and 66 extends circumferentially around the metal casing 40 and each arched portion 62 and 66 comprises an arch 68H and 68I respectively having pairs of axial ends 70H and 72H and 70I and 72I respectively and troughs 74H and 74I respectively. Each arched portion 62 and 66 is arranged such that the troughs 74H and 74I of the arches 68H and 68I respectively is radially inwardly of imaginary frustocone 76H and imaginary cylinder 76I interconnecting the axial ends 70H and 72H and 70I and 72I respectively of the arches 68H and 68I.

Preferably the troughs 74H and 74I of the arches 68H and 68I are arranged radially inwardly of at least one of the axial ends 70H and 70I or 72H and 72I respectively of the arches 68H and 68I. Preferably the troughs 74H and 74I of the arches 68H and 68I are arranged radially inwardly of both the axial ends 70H and 72H and 70I and 72I respectively of the arches 68H and 68I.

In this arrangement the arched portion 64 is arranged substantially in the plane Y containing the fan blades 34 of the gas turbine engine 10. The trough 74H of the arched portion 62 is arranged substantially in the plane Y containing the fan blades 34 of the gas turbine engine 10.

Thus the axial end 70H of the arched portion 62 is substantially in a plane containing the leading edges of the fan blades 34 and the axial end 72H of the arched portion 62 is substantially in a plane containing the trailing edges of the fan blades 34. The trough 74H is arranged substantially in the plane Y containing the mid chord of the fan blades 34.

It is preferred, in all embodiments, that the axial ends of the arched portion, or portions, surrounding the rotor blades are arranged substantially in planes containing the leading and trailing edges at the tip of the rotor blades.

The metal casing may be manufactured from nickel, a nickel alloy, a steel alloy, aluminium, an aluminium alloy, titanium or titanium alloy. The metal casing may be manufactured into the appropriate shape by superplastic forming.

It may be possible to manufacture the casing from other materials as an alternative to metal, for example composite materials.

It may be desirable in some circumstances to provide a number of continuous layers of a strong fibrous material wound around the metal casing and to further increase the energy absorbing capability of the fan blade containment assembly. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing and the continuous layers of fibrous material.

The invention has been described with reference to a fan blade containment assembly, however it is equally applicable to a compressor blade containment assembly and a turbine blade containment assembly.

We claim:

1. A gas turbine engine rotor blade containment assembly comprising a generally cylindrical, or frustoconical, casing, the casing having at least one arched portion, the at least one arched portion extending circumferentially around the casing, the at least one arched portion having axial ends, the at least one arched portion comprising a radially inwardly extending arch in which a trough of the arch is radially inward of both axial ends of the arch, the axial ends of the arch having the same radius, wherein the at least one arched portion is arranged between cylindrical portions of the casing, wherein the cylindrical portions of the casing have the same radius, and the at least one arched portion is arranged axially downstream of a plane containing the rotor blades of the gas turbine engine.

2. A gas turbine engine rotor blade containment assembly as claimed in claim 1 wherein two arched portions are axially downstream of the plane containing the rotor blades of the gas turbine engine.

3. A gas turbine engine rotor blade containment assembly as claimed in claim 2 wherein said two arched portions are immediately axially adjacent each other.

4. A gas turbine engine rotor blade containment assembly as claimed in claim 3 wherein the casing comprises a circumferentially and radially extending rib arranged intermediate said two arched portions.

5. A gas turbine engine rotor blade containment assembly as claimed in claim 3 wherein the casing comprises a circumferentially and radially extending rib arranged at each axial end of the two arched portions.

6. A gas turbine engine rotor blade containment assembly as claimed in claim 2 wherein the casing comprises a circumferentially and radially extending rib arranged intermediate said two arched portions.

7. A gas turbine engine rotor blade containment assembly as claimed in claim 2 wherein the casing comprises a circumferentially and radially extending rib arranged at each axial end of the two arched portions.

8. A gas turbine engine rotor blade containment assembly as claimed in claim 1 wherein the casing comprises a circumferentially and radially extending rib arranged at an axial end of the at least one arched portion.

9. A gas turbine engine rotor blade containment assembly as claimed in claim 1 wherein the casing comprises a circumferentially and radially extending rib arranged at each axial end of the at least one arched portion.

10. A gas turbine engine rotor blade containment assembly as claimed in claim 1 wherein the arch has an arcuate shape in cross-section or comprises a plurality of straight lines in cross-section.

11. A gas turbine engine rotor blade containment assembly as claimed in claim 10 wherein the arcuate shape comprises a section of a circle, a section of an ellipse or a catenary shape.

12. A gas turbine engine rotor blade containment assembly as claimed in claim 10 wherein the plurality of straight lines comprises a section of a polygon.

13. A gas turbine engine rotor blade containment assembly as claimed in claim 1 wherein the rotor blade containment assembly is a fan blade containment assembly.

14. A gas turbine engine rotor blade containment assembly as claimed in claim 1 wherein the casing is a metal casing.

15. A gas turbine engine rotor blade containment assembly as claimed in claim 14 wherein the metal casing comprises titanium, titanium alloy, aluminium, aluminium alloy, nickel, nickel alloy or steel.

16. A gas turbine engine rotor blade containment assembly as claimed in claim 14 wherein the at least one arched portions is superplastically formed.

* * * * *